United States Patent
Witte et al.

[15] 3,688,217
[45] Aug. 29, 1972

[54] LASER COLD CATHODE ARRANGEMENT

[72] Inventors: Robert S. Witte; Lee M. Frantz, both of Redondo; Eugene R. Peters, Torrance, all of Calif.

[73] Assignee: TRW Inc., Redondo Beach, Calif.

[22] Filed: Dec. 21, 1970

[21] Appl. No.: 100,100

[52] U.S. Cl. ............... 331/94.5, 313/198, 313/201, 313/311
[51] Int. Cl. .............................................. H01s 3/00
[58] Field of Search .....331/94.5; 313/198, 201, 220, 313/311

[56] References Cited

UNITED STATES PATENTS

| | | | |
|---|---|---|---|
| 3,555,451 | 1/1971 | Witte et al. | 331/94.5 |
| 3,486,058 | 12/1969 | Hernquist | 331/94.5 X |
| 3,566,302 | 2/1971 | Rhodes | 331/94.5 |
| 3,424,997 | 1/1969 | Lopez et al. | 331/94.5 |
| 3,449,694 | 6/1969 | Bell | 331/94.5 |
| 3,500,242 | 3/1970 | Young | 331/94.5 |
| 3,569,858 | 3/1971 | Wittenman et al. | 331/94.5 |

OTHER PUBLICATIONS

Large et al.: " A Compost Pulsed Gas Laser for the Far Infrared," Applied Optics, vol. 4, pp. 625– 626, May, 1965

Dumanchin et al.; Comptes Rendus, vol. 269, pp. 916–917, Nov. 1969.

MacNair: " Study of Electron Emitters for Use in Gas Lasers," IEEE Jour. of Quant. Elect., Vol. QE–5, pp. 460– 470, Sept. 1969

Knudsen et al.: " Argon Ion Lasers," Sperry Eng. Rev., vol. 19, pp. 27– 31, June, 1966

Dezenberg et al.: " The Use of a Multipath Cell as a $CO_2$-N Gas Laser Amplifier and Oscillator," Applied Optics, vol. 6, pp. 1541– 1543, Sept., 1967

Hernquist: " Low Radiation Noise He–Ne Laser," RCA Review, pp. 429– 434, Sept., 1969

Carbone: " Continuous Operation of a Long–Lived Carbon Dioxide Laser Tube," IEEE Jour. of Quant. Elect., Vol. QE–4, March, 1968

*Primary Examiner*—Ronald L. Wibert
*Assistant Examiner*—Edward S. Bauer
*Attorney*—Daniel T. Anderson, Jerry A. Dinardo and Edwin A. Oser

[57] ABSTRACT

A gaseous ion laser system includes a cold cathode disposed in an envelope portion so as to form a tight or dash pot fit therewith. A trigger electrode is in intimate contact with the exterior surface of the envelope portion and closely spaced above the emitting surface of the cathode so that only a minimum starting voltage is required to preionize the gas. By using as the cathode material, a normally solid metal having a higher melting point than the material of the envelope portion that houses the cathode, the necessary close spacing between the cathode and trigger electrode may be realized by employing a precision bore for the cathode housing and machining the cathode to fine tolerances that provide the dash pot fit.

10 Claims, 3 Drawing Figures

Patented Aug. 29, 1972
3,688,217
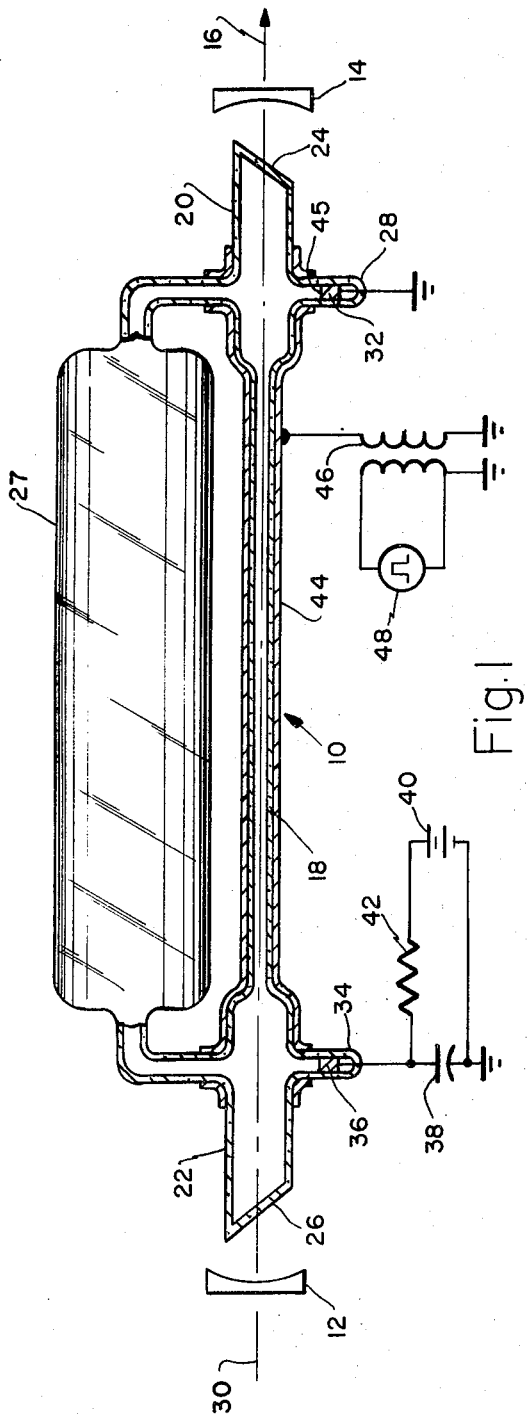
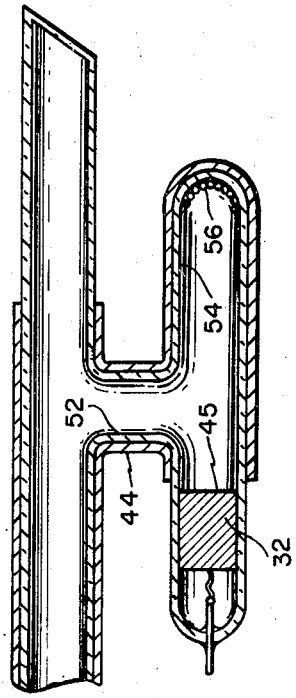
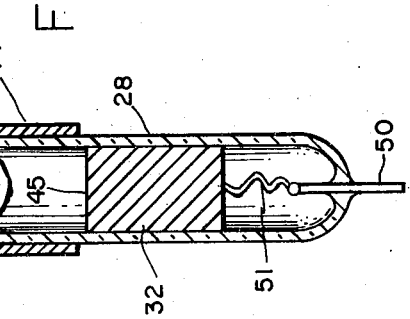
Robert S. Witte
Lee M. Frantz
Eugene R. Peters
INVENTORS
BY *Jerry A. Dinardo*
AGENT

LASER COLD CATHODE ARRANGEMENT

BACKGROUND OF THE INVENTION

1. Field of the Invention

This invention relates to improvements designed to minimize the starting voltage of gas discharge devices employing field emitting cathodes, and particularly, to improvements permitting a wider choice of metals for use as the cold cathode material in gaseous ion lasers. The invention herein described was made in the course of or under a contract or subcontract thereunder, with the Department of the Navy.

2. Description of the Prior Art

In copending application Ser. No. 716,939 of Robert S. Witte et al., filed Mar. 28, 1968, entitled "Laser Cold Cathode Apparatus," now U.S. Pat. No. 3,555,451 issued Jan. 12, 1971, there is disclosed a gaseous ion laser wherein the discharge between cathode and anode electrodes is effectuated by field emission from a non-thermionic or cold cathode, as distinguished from prior devices utilizing thermionic cathodes. In that application, several low melting point metals are disclosed as having desirable properties for use as cold cathode materials. Such desirable properties include low melting point, low vapor pressure, low work function, and low chemical activity, and the metals then found to possess these properties and to be especially suitable as cold materials include bismuth, lead, tin, indium, and gallium.

Further experimentation has been conducted with other cathode materials to gain a better understanding of the phenomenon of cold cathode emission as applicable to the initiation and maintenance of stimulated emission in a gaseous ion laser system. This experimentation has revealed the discovery that not only will operable cold cathode emission result from low melting point metals, but also it is possible to obtain cold cathode emission, localized cathode melting, and lasing with equally satisfactory results from high melting point metals.

SUMMARY OF THE INVENTION

This invention is based on the discovery that in a gaseous ion laser system employing a starting electrode in conjunction with a cold cathode for initiating a gas discharge, and an anode in conjunction with the cold cathode for sustaining a lasing discharge, cold cathode emission suitable for initiating and sustaining lasing action can be realized from high melting point metals. The high electrostatic fields that are necessary to initiate the discharge result from a structural configuration of electrode elements in which the spacing between the starting electrode and the emitting surface of the cathode is minimized.

In a preferred configuration, the cathode is machined to close tolerances from metal having a higher melting point than the envelope portion which houses it. The envelope portion is formed with a precision bore so that the cathode makes a dash pot fit in the bore. The starting electrode is in intimate contact with the exterior surface of the envelope portion or cathode housing and extends close to but is spaced above the emitting surface of the cathode, to provide highly concentrated electric field at the periphery of the cathode emitting surface.

BRIEF DESCRIPTION OF THE DRAWING

FIG. 1 is a diagrammatic view of a gaseous ion laser system embodying a cold cathode and starting electrode configuration according to the invention.

FIG. 2 is an enlarged fragmentary sectional view showing a cold cathode in an appendage of a laser tube; and FIG. 3 is a fragmentary sectional view showing a cold cathode in a different form of appendage.

DESCRIPTION OF THE PREFERRED EMBODIMENTS

Referring now to FIG. 1, there is illustrated a gaseous ion laser apparatus including a laser tube 10 disposed within an optical resonator cavity constituted by two mirror elements 12 and 14. One of the mirror elements of the optical cavity, say element 14, is at least partially transmissive according to conventional design to permit an output laser beam 16 to issue therefrom.

The envelope of the laser tube 10 includes an elongated main discharge tube 18 of dielectric material, such as Pyrex glass, quartz, or ceramic, extending between two end portions 20 and 22. The end portions 20 and 22 are closed by sealed windows 24 and 26, respectively, that are inclined at the Brewster angle.

A laser gas reservoir 27 in the form of a large diameter tube is connected through the end portions 20 and 22 in gas communicating relationship with the discharge tube 18. The laser gas contained within the laser tube 10 is preferably one of the noble gases, such as argon, helium, neon, xenon, krypton.

One end portion 20 has an appendage 28 offset from the longitudinal axis 30 along which the discharge tube 18, windows 24, 26 and mirror elements 12, 14 are aligned and along which the output laser beam 16 coincides. The appendage 28 houses a non-thermionic or cold cathode 32 that is maintained at ground potential.

Similarly, the other end portion 22 has an offset appendage 34 that houses a collector electrode or anode 36. Both appendages 28 and 34 are made of dielectric material similar to that of the discharge tube 18, such as Pyrex glass, quartz, or ceramic. The anode 36 is connected to the positive high voltage side of a capacitor 38, the other side of which is grounded. The capacitor 38 receives its charge from a dc voltage source 40 through a series resistor 42.

A trigger or starting electrode 44 surrounds the discharge tube 18 and extends between the appendages 28 and 34. The starting electrode 44 may comprise a conductive coating of silver, gold, Aquadag, or the like, applied to the exterior of the discharge tube 18 and adjoining areas of the end portions 20 and 22. The starting electrode 44 extends over a sufficient length of the appendage 28 housing the cold cathode 32 as to circumscribe the emitting surface 45 of the cold cathode 32. Preferably, though not essentially, the starting electrode 44 may also extend along the other appendage 34 to likewise cover a portion of the anode 36.

The starting electrode 44 is connected to the secondary of a high voltage pulse transformer 46 which, in conjunction with a pulse source 48, delivers positive pulses of peak values of +2 kilovolts to +10 kilovolts to the starting electrode 44. The dc voltage source 40 may supply an anode voltage ranging from about +200 volts for an anode-to-cathode spacing of 2 to 3 inches to about +12 kilovolts for an anode-to-cathode spacing of 10 feet.

As illustrated in more detail in the enlarged fragmentary view of FIG. 2, the cold cathode 32 is formed of a solid cylindrical slug of metal. The cylindrical surface of the cold cathode 32 is machined to a precise diameter. The appendage 28 is made from precision cylindrical tubing. Its inner cylindrical surface is defined by a precision bore having a tolerance of ±0.0002 inch and barely larger than the diameter of the cold cathode 32 so that the cold cathode 32 forms a dash pot fitting within the appendage 28. For a dash pot fitting, the clearance between the cold cathode 32 and appendage 28 is preferably about 0.0005 inch and may be as high as 0.001 inch. The fit between the cold cathode 32 and internal wall of the appendage 28 should be as close as possible, with only sufficient clearance to allow for the differential thermal expansion characteristics of the materials from which the cold cathode and appendage are made.

In the past, the cold cathodes for ion laser applications have been made from low melting point metals such as indium, gallium, bismuth, tin and lead, that have lower melting points than the envelope portion housing them. While those materials are in fact now taken for granted as being the most satisfactory cold cathode metals for lasers, it is also now possible, by following the teachings of this invention, to construct the cold cathode from high melting point metals. Accordingly, the cold cathode 32 is made from such a metal, and preferably is one of the metals such as aluminum, copper, nickel, silver and tungsten, all of which have higher melting points than the appendage 28.

In order to achieve successful cold cathode operation with these high melting point metals at less than prohibitively high voltages, it is necessary to provide close spacing between the starting electrode 44 and the emitting surface 45 of the cold cathode 32. To this end, the cold cathode 32 is provided with a dash pot fit inside the appendage 28, as described above. Secondly, the starting electrode 44 is placed in intimate contact with the exterior surface of the appendage 28, as by applying it as a coating. Further, the starting electrode 44 coating is extended sufficiently close to the emitting surface 45 of the cold cathode 32 to ensure a concentration of electric field between the peripheral regions of the cold cathode 32 emitting surface and the end of the starting electrode. To take advantage of the higher electric field concentration afforded by a sharp edge than by an extended surface, the starting electrode 44 coating is not extended below the emitting surface of the cold cathode 32, but rather is terminated slightly above the cathode emitting surface. The spacing between the starting electrode 44 and the cold cathode 32 is not as critical as the close fit between the cold cathode 32 and the inside wall of the appendage 28.

External connection to the cold cathode 32 is afforded by a rigid terminal pin 50, such as of tungsten, which is hermetically sealed to the outer extremity of the appendage 28, and a partially flexible metal ribbon 51, such as of nickel, that is welded between the inner tip of the terminal pin 50 and the lower or non-emitting surface of the cold cathode 32.

In the interest of simplifying construction through standardization of parts, it is preferred that the anode 36 be identical to the cold cathode 32 both in material and in construction. In that case, the appendages 34 and 28 are identical.

To facilitate an understanding of the process of cold cathode or field emission, it is helpful to consider the cold cathode 32 and starting electrode 44 as the plates of a capacitor in which the dielectric is made up in part by the intervening appendage 28 and in part by the laser gas molecules between the emitting surface 45 of the cold cathode 32 and the adjacent exposed inner surface of the appendage 28 that is not contacted by the cold cathode 32. Similarly, the anode 36, appendage 34, laser gas molecules in the vicinity of the anode 36 and the starting electrode 44 constitute another capacitor in parallel with the first one. If sufficiently high electrostatic field can be impressed across the capacitors to break down the dielectric, then the cold cathode 32, as well as the anode 36, can emit electrons which can flow as displacement current between the cold cathode 32 and starting electrode 44 and between the anode 36 and starting electrode 44. The necessary high electrostatic field can result from applying a high voltage pulse to the starting electrode 44 from the pulse source 48 and pulse transformer 46.

Required field strengths of the order of $10^6$ to $10^8$ volts per centimeter are realized by disposition of the emitting surface 45 of the cold cathode 32 and the starting electrode 44 in the manner discussed above and by roughening the emitting surface 45 of the cold cathode 32 in its peripheral regions next to the appendage 28. The roughening is such as to form protrusions that have tip radii of $10^{-5}$ to $10^{-4}$ centimeters. One effective method of roughening the cathode emitting surface 45 is to apply thereto continued high voltage pulses of 40 kilovolts from a Tesla coil. Thereafter, the forming process continues of its own accord during lasing operation, and is brought about by the local melting of the cathode emitting region by the high tube currents, which correspond to current densities of the order of $10^7$ to $10^8$ amperes per square centimeter at the cathode surface. The locally melted emitting regions are subsequently shaped under the action of the local electric fields into highly efficient field emitting points. This mechanism of high current emission differs from other forms of cold cathode emission wherein the dominant emission mechanism is attributed to secondary emission wherein the dominant emission mechanism is attributed to secondary emission induced by ion bombardment of the cathode surface.

Briefly, the operation of the laser apparatus is as follows. With the application of the positive trigger pulse to the starting electrode 44, electrons are emitted from the cold cathode 32 due to field emission. Electron emission will also occur from the anode 36 if the trigger voltage is sufficiently in excess of the positive dc anode voltage furnished by the dc voltage source 40. The emitted electrons collide with the laser gas molecules causing them to ionize, whereupon a conducting path is produced between the cold cathode 32 and anode 36 through which the capacitor 38 may discharge. The heavy current pulse that results from the discharge of the capacitor 38 ionizes the laser gas molecules sufficiently to produce stimulated emission and a pulse of laser light.

At the end of the laser current pulse, the conducting path between the anode 36 and cold cathode 32 is broken, thereby allowing the capacitor 38 to recharge from the dc voltage source 40 through the series resistor 42. When the capacitor 38 is fully charged, the system is ready for the application of the next trigger pulse and the generation of another laser light pulse.

The above description applies to the operation of the laser in the pulse mode. For continuous wave operation, the capacitor 38 is removed and the source 40 is replaced by a constant high voltage, high current dc supply. A single trigger pulse then will cause the apparatus to lase continuously.

For cathodes ranging in diameter from ½ cm to 3 cm in diameter, the tube current may range from 2 amperes to above 3,000 amperes depending upon the gas used. For laser tube lengths in excess of 5 feet, it is essential that the anode 36, as well as the cathode, be a good emitter. Otherwise, the required trigger voltage would be exceedingly high. For this additional reason, the anode 36 and cold cathode 32 may be identical as previously discussed herein.

During laser tube operation, the localized surface melting of the cold cathode 32 is accompanied by some spewing of the cathode material to the adjoining walls of the laser tube 10. The gas atmosphere within the laser tube 10 is thus exposed both to the fresh metal on the cathode surface 45 as well as the newly deposited metal on the tube walls. A desirable gettering action may be realized by selecting as the cathode material a metal that readily reacts with the gaseous contaminants, such as oxygen or water vapor. Barium is a well known getter material and may be used to good advantage as the cathode material in conjunction with Pyrex glass as the appendage material. Titanium may also be used as a cathode material with good gettering action in combination with any of the materials mentioned for the appendage.

Although cathode material deposits may be used to good advantage as gettering agents, care must be taken to prevent the deposits from reaching the windows 24 and 26 where they will interfere with the laser beam 16. Accordingly, the appendage housing the cathode may be shaped in the form of a T. Such a T-shaped tubular appendage 52 is shown in FIG. 3. Here the cold cathode 32 is housed in one arm of the T so that its emitting surface 45 is in direct line of sight relation with the cavity wall 54 formed in the other arm of the T. The cathode material that spews is caused to deposit preferentially on the cavity wall 54 where the resulting deposits 56 will not interfere with the laser beam 16.

The embodiments of the invention in which an exclusive property or privilege is claimed are defined as follows:

1. A gaseous ion laser, comprising:
   an hermetically sealed envelope enclosing a volume of ionizable gas capable of stimulated emission and including a cathode housing portion formed with an internal bore;
   a non-heated cathode electrode made of normally solid metal filling said bore;
   said cathode electrode made of metal having a higher melting point than the material constituting said cathode housing portion and closely fitting within said cathode housing portion but sufficiently spaced from the walls thereof to accommodate differential expansion therebetween over the normal range of operating temperature of said laser;
   said cathode electrode having an electron emitting surface exposed to said ionizable gas;
   a metallic trigger electrode in intimate contact with the exterior of said cathode housing portion and axially spaced from said cathode electrode and terminating a slight distance above said electron emitting surface of said cathode electrode;
   an anode electrode within said envelope and spaced from said cathode electrode; and
   terminal means connected to said anode, cathode, and trigger electrodes for applying operating potentials thereto.

2. The invention according to claim 1, wherein said cathode electrode is made of a metal selected from the group consisting of aluminum, copper, nickel, silver, and tungsten.

3. The invention according to claim 1, wherein said cathode electrode is made of gettering material capable of reacting with gaseous contaminants within said envelope.

4. The invention according to claim 3, wherein said cathode electrode is made of a metal selected from the group consisting of barium and titanium.

5. The invention according to claim 1, wherein said cathode and said bore have circularly cylindrical mating surfaces with a clearance no greater than about 0.001 inch.

6. The invention according to claim 1, wherein said cathode electrode is a solid cylindrical slug having a machined cylindrical surface, and said cathode housing portion has a precision bore within which said slug is closely fit with just sufficient clearance to allow thermal differential expansion therebetween at the operating temperature of the laser.

7. The invention according to claim 1, and further including an optical cavity within which said envelope is disposed.

8. A gaseous ion laser, comprising:
   an hermetically sealed envelope including an elongated discharge tube having a longitudinal axis, and a pair of Brewster windows axially aligned with said discharge tube and closing the ends of said envelope;
   an ionizable gas confined within said envelope and capable of stimulated emission;
   said envelope include a cathode housing disposed between one end of said discharge tube and one of said Brewster windows and extending to one side of said axis;
   said cathode housing being made of dielectric material formed with an internal bore;
   a non-heated cathode electrode made of normally solid metal filling said bore;
   said cathode electrode made of metal having a higher melting point than the material constituting said cathode housing and closely fitting within said cathode housing but sufficiently spaced from the walls thereof to accommodate differential expansion therebetween over the normal range of operating temperature of said laser;
   said cathode electrode having an electron emitting surface exposed to said ionizable gas;

a metallic trigger electrode in intimate contact with the exterior of said cathode housing and axially spaced from said cathode electrode and terminating a slight distance above said electron emitting surface of said cathode electrode;

an anode electrode within said envelope and disposed between the other end of said discharge tube and the other Brewster window; and terminal means connected to said anode, cathode, and trigger electrodes for applying operating potentials thereto.

9. The invention according to claim 8, wherein said cathode housing forms one of the arms of a T-shaped tubular appendage of said envelope;

said cathode electrode being disposed within said one arm of the T with its emitting surface exposed to the cavity wall of the other arm of the T, whereby said cavity wall forms a collection trap for any metallic deposits resulting from spewing of cathode material during laser operation.

10. In a laser system including an elongated discharge tube and an ionizable gas confined within said discharge tube and capable of stimulated emission;

a cathode housing at one end of said discharge tube;

an anode housing at the other end of said discharge tube;

each of said housings comprising a member of dielectric material formed with a precision cylindrical bore;

a non-heated cathode electrode within said cathode housing and formed of a cylindrical slug of metal machined to form a close fit within said cathode housing bore;

an anode electrode within said anode housing formed of a cylindrical slug of metal machined to form a close fit within said anode housing bore;

said cathode and anode electrodes each spaced from the walls of said cathode and anode housing respectively to accommodate differential expansion therebetween over the normal range of operating temperature of said laser system;

an electrically conductive coating on the exterior of said discharge tube and extending over portions of said cathode and anode housings but spaced axially from said cathode and anode electrodes respectively and terminating a slight distance above the emitting surfaces of said cathode and anode electrodes; and terminal means connected to said cathode and anode electrodes and to said conductive coating for applying ionizing potentials thereto.

* * * * *